United States Patent [19]

Kim

[11] Patent Number: 6,147,682
[45] Date of Patent: Nov. 14, 2000

[54] MONITOR FOR USE WITH COMPUTER SYSTEM AND METHOD OF CONTROLLING SUPPLY OF POWER TO COMPUTER PERIPHERALS CONNECTED WITH THE MONITOR

[75] Inventor: Yong-Hee Kim, Suwon, Rep. of Korea

[73] Assignee: SamSung Electronics, Ltd., Suwon, Rep. of Korea

[21] Appl. No.: 08/852,732

[22] Filed: May 7, 1997

[30] Foreign Application Priority Data

May 7, 1996 [KR] Rep. of Korea ...................... 96-14792

[51] Int. Cl.[7] ................................. G09G 5/00; G06F 9/06
[52] U.S. Cl. ........................... 345/211; 395/750; 395/290
[58] Field of Search ........................ 345/211, 156, 345/326, 518, 520; 361/729, 682; 710/62, 63, 64, 65; 713/300, 310; 395/750.01, 750.03, 750.06, 750.07, 882

[56] References Cited

U.S. PATENT DOCUMENTS

| | | | |
|---|---|---|---|
| 3,740,569 | 6/1973 | Carcia | 307/11 |
| 4,373,183 | 2/1983 | Means et al. | 364/200 |
| 4,395,710 | 7/1983 | Einolf, Jr. et al. | 340/825.5 |
| 4,528,662 | 7/1985 | Floyd et al. | 370/92 |
| 4,907,183 | 3/1990 | Tanaka | 364/707 |
| 4,980,836 | 12/1990 | Carter et al. | 364/487 |
| 5,036,251 | 7/1991 | Lee | 315/10 |
| 5,163,124 | 11/1992 | Yabe et al. | 395/750 |
| 5,237,258 | 8/1993 | Crampton | 320/14 |
| 5,257,163 | 10/1993 | Buist et al. | 361/729 |
| 5,448,554 | 9/1995 | Van Steenbrugge | 370/17 |
| 5,465,366 | 11/1995 | Heineman | 395/750 |
| 5,485,458 | 1/1996 | Oprescu et al. | 370/85.2 |
| 5,587,876 | 12/1996 | O'Brien et al. | 361/682 |
| 5,675,364 | 10/1997 | Stedman et al. | 345/211 |
| 5,675,813 | 10/1997 | Holmdahl | 395/750 |
| 5,689,574 | 11/1997 | Heirich et al. | 381/158 |
| 5,730,512 | 3/1998 | Heirich | 312/7.2 |
| 5,758,171 | 5/1998 | Ramamurthy et al. | 395/750.01 |
| 5,767,844 | 6/1998 | Stoye | 345/212 |
| 5,784,581 | 7/1998 | Hannah | 395/290 |
| 5,877,745 | 3/1999 | Beeteson et al. | 345/156 |
| 5,884,086 | 3/1999 | Amoni et al. | 395/750.01 |
| 5,890,015 | 3/1999 | Garney et al. | 395/882 |
| 5,914,877 | 6/1999 | Gulick | 364/400.01 |
| 5,938,770 | 8/1999 | Kim | 713/300 |

FOREIGN PATENT DOCUMENTS

| | | | |
|---|---|---|---|
| 0317072 | 5/1989 | Germany | G06F 1/00 |
| 62-277440 | 5/1989 | Japan | G06F 3/16 |

OTHER PUBLICATIONS

Craig Matsumoto, "Cypress Broadens Controller Line for Universal Serial Bus", EETIMES, issue 952, May 5, 1997, p. 46.

Primary Examiner—Amare Mengistu
Assistant Examiner—Jimmy Hai Nguyen
Attorney, Agent, or Firm—Robert E. Bushnell, Esq.

[57] ABSTRACT

A computer monitor for allowing the easy connection of computer peripherals thereto, and supplying a power supply voltage from an internal power supply therein to the computer peripherals via universal serial bus hubs. The monitor has a power supply for converting externally applied AC power into DC power; and a universal serial bus hub having at least one upstream port and at least two downstream ports; wherein the upstream port is electrically connected in communication with the computer system, and the downstream ports receive DC power in response for a power switching signal in accordance with power supply control information from the computer system through the upstream port to selectively provide the DC power to external devices connected therewith in response to the power switching signal.

29 Claims, 11 Drawing Sheets

MONITOR FOR USE WITH COMPUTER SYSTEM AND METHOD OF CONTROLLING SUPPLY OF POWER TO COMPUTER PERIPHERALS CONNECTED WITH THE MONITOR

CLAIM FOR PRIORITY

This application make reference to, incorporates the same herein, and claims all benefits accruing under 35 U.S.C. §119 through my patent application entitled Monitor For Use With Computer System And Method Of Controlling Supply Of Power To Computer Peripherals Connected With The Monitor earlier filed on May 7, 1996 in the Korean Industrial Property Office, and there regularly assigned Ser. No. 1996/14792.

BACKGROUND OF THE INVENTION

1. Field of the Invention

The present invention relates to a display apparatus for use with a computer system, and, more particularly, to a process and computer monitor for supplying a power supply voltage from an internal power supply therein to computer peripherals via universal serial bus hubs.

2. Background Art

A typical personal computer may have an associated monitor serving as a display apparatus, a keyboard and a printer, a light pen or a plotter. The monitor associated with the computer is connected with a body of the computer via a video cable, such as a D-Sub cable or a BNC video cable. The computer provides video signals, e.g., red, green and blue video signals, vertical and horizontal synchronization signals, and overall information required to control the monitor, to the monitor through the video cable. Also, information indicative of the monitor-processed results from the monitor is provided to the computer through the video cable.

In addition to the keyboard and the monitor, if the other peripheral devices, such as a printer, a light pen, a plotter and the like, are connected with the conventional computer, the sheer number of cables begins to make the connections between the computer and the peripheral devices complicated. Also, since conventional computers are not always provided with a plug and play function, it is difficult for a user to connect the peripheral devices with the computer. A universal serial bus system has been developed in one effort to ameliorate some of these difficulties.

A monitor has five main sections, a power supply, a video signal processor, a horizontal and vertical synchronization signal processor, a monitor controller and a cathode ray tube. The power supply receives an alternating current voltage which is externally applied through a plug, and provides several levels of direct current voltages to respective monitor circuit components. Also, the power supply has a monitor power management system for reducing power consumption.

The monitor controller receives monitor driving information through the video cable connected with the computer and generates two groups of control signals, namely a first group of control signals Cv1–Cvn necessary for processing the red, green and blue video signals and a second group of control signals Cs1–Csm used to control screen and focus, in response to the monitor driving information.

The video signal processor is provided to process the video signals from the computer via the video cable in response to the first group of control signals Cv1–Cvn. The video signals processed thus are applied to electron guns of the cathode ray tube so that the electron guns can radiate beams corresponding to the red, green and blue video signals. The horizontal and vertical synchronization signal processor is provided to process horizontal and vertical synchronization signals hereinafter, referred to as "Hsync and Vsync") which are applied from the computer via the video cable and deflect the beams from the electron guns in a direction, so that screen and focus can be controlled. Other contemporary designs equip the monitor with an audio unit generating an audio signal and a voice input unit for converting an audio signal into an electrical signal. I have found that there is some difficulty in using the peripheral expansion function of the computer for these features of the monitor. I have also found that, since conventional monitors are not equipped with connectors for communicating with peripheral devices, plug and play functions can not be performed.

Further, contemporary designs fail to provide an adequate serial bus system required for effective peripheral expansion with these computers with such monitors. Among designs representative of contemporary practice in the art, Oprescu et al., U.S. Pat. No. 5,485,458, Bus Interconnect Circuit Including Port Control Logic For A Multiple Node Communication Network, issued on Jan. 16, 1996 discusses a dominant logic physical bus that is coupled to all ports in a node. This is part of a bus interconnect device including port control logic for a communication network having a plurality of multi-port nodes that are connected with point-to-point links. Van Steenbrugge U.S. Pat. No. 5,448,554, Data Communication System Based On A Serial Bus And A Monitor Station For Use With Such System, issued on Sep. 5, 1995, discusses a data communication system based on a serial bus and a monitor station for use with such system. The monitor station, irrespective of the source of a particular bit, allows for sampling such bit in that it emulates an uncommitted slave station. Floyd et al., U.S. Pat. No. 4,528,662, for a Multiplex Control System Having Enhanced Integrity, issued on Jul. 9, 1985 discusses a serial data communication system in which bidirectional serial data communication is effected between a central control station and one or more remote stations. Einolf, Jr. et al., U.S. Pat. No. 4,395,710, for a Bus Access Circuit For High Speed Digital Data Communication, issued on Jul. 26, 1983, discusses a serial data communications network in which a plurality of stations communicate among one another on a single serial bus. Means et al., U.S. Pat. No. 4,373,183, for a Bus Interface Units Sharing A Common Bus Using Distributed Control For Allocated Of the Bus, issued on Feb. 8, 1983, discusses a plurality of bus interface units (BIU) that are interconnected by the distributed system data bus and a serial bus allocation line. Each bus interface unit may in turn be connected to either one or several data processing units, an I/O port, or a bridge connecting to still another similar bus network. From my study of the contemporary practice and art, I find that there is a need for an effective peripheral expansion that permits effective use of the monitor of a computer, however, there is not yet even a serial bus that can produce such desired result.

SUMMARY OF THE INVENTION

It is therefore an object of the present invention to provide a computer monitor having a universal serial bus hub capable of connecting computer peripherals.

It is another object to provide a computer monitor which is provided with a universal serial bus hub and a power supply therein, and in which power from the power supply can be provided to peripheral devices connected with the universal serial bus hub.

It is a further object to provide a computer monitor which is provided with a universal serial bus hub therein and which can drive a speaker unit connected with the universal serial bus hub.

It is an additional object to provide a computer monitor which is provided with a universal serial bus hub therein and which can drive a microphone unit connected with the universal serial bus hub.

It is another object to provide a computer monitor which is provided with several universal serial bus hubs therein and which can drive a speaker unit and a microphone unit at the same time.

It is a further object to provide a computer monitor which is provided a universal serial bus hub therein and in which a display control signals from a host computer can be provided through the universal serial bus hub to a monitor controller.

It is another object to provide a computer monitor which can intercept supply of power from a power supply therein to universal serial bus devices connected with the monitor, when abnormal power of more than a specific range is applied to the monitor.

According to an aspect, a computer monitor for use with a computer system having a root hub comprises a power supply for converting an externally applied AC (alternating current) power into a DC (direct current) power; and a universal serial bus hub having at least one upstream port and at least two downstream ports. The upstream port is electrically connected in communication with the computer system, and the downstream ports receive a power switching control signal in accordance with power supply control information from the computer system through the upstream port and selectively provides the DC power to external devices connected therewith in response to the power switching signal. The monitor uses a cathode ray tube monitor, a monitor controller for generating two groups of control signals in response to monitor driving information applied through the upstream port from the computer system, a first of the two groups being required to process a plurality of video signals and a second of the two groups being required to control screen and focus of the monitor; a video signal processor for processing the video signals from the computer system via a universal serial bus cable connected between the computer system and the monitor to provide processed video signals to a plurality of electron guns of the monitor; and a horizontal/vertical synchronization signal processor for deflecting beams generated from the electron guns in response to horizontal and vertical synchronization signals applied from the computer system via the universal serial bus cable so as to adjust the screen and focus.

In the computer monitor, the power supply is controlled in accordance with a display power management system of video electronic standard association. Also, the power supply operates in accordance with power saving operations having a stand-by mode, a suspend mode and a power off mode. The power supply uses the DC power of about +5 V as an operation voltage of the downstream ports.

In the computer monitor, the universal serial bus hub contemplates a universal serial bus controller for performing a control operation in accordance with information applied from the computer system via the root hub, and a power switching portion for selectively providing the DC power to a plurality of universal serial bus devices by means of control of the universal serial bus controller. The universal serial bus devices have at least one of peripheral devices composed of a keyboard, an audio system and a printer. The monitor controller and the universal serial bus controller are electrically connected by $I^2C$ (inter-integrated circuits serial interface) or universal asynchronous receiver transmitter therebetween. The upstream port has two power sources and two data transmitting segments, the two power sources having a power supply segment and a ground segment. The universal serial bus controller receives data from the computer system over the upstream port and relays the data to the downstream port.

In the computer monitor, the universal serial bus controller also contemplates means for decoding digital information of voice generated from a speaker unit, and an encoder encoding analog signal of voice generated from a microphone unit. The decoder has a digital-to-analog converter for converting the digital information of voice into analog signal, and wherein the encoder has an analog-to-digital converter for converting the analog signal of voice into a digital signal. The monitor has a decoder for decoding digital information of voice generated for a speaker unit, and an encoder for encoding analog signal of voice generated from a microphone unit, the decoder and the encoder being located outside the universal serial bus controller.

According to another aspect, a method of controlling a power supply for use with a computer monitor envisions generating a power switching control signal in accordance with power supply control information from the computer system; designating at least one of the downstream ports in response to the power switching control signal so as to supply the power through the designated downstream port to a universal serial bus device connected thereto; determining whether the power through the designated downstream port is above a limit value of over-current thereof; providing a signal indicative of more than the limit value of the over-current, when the power through the designated downstream port is above the limit value of over-current; and intercepting supply of power to the designated downstream port.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
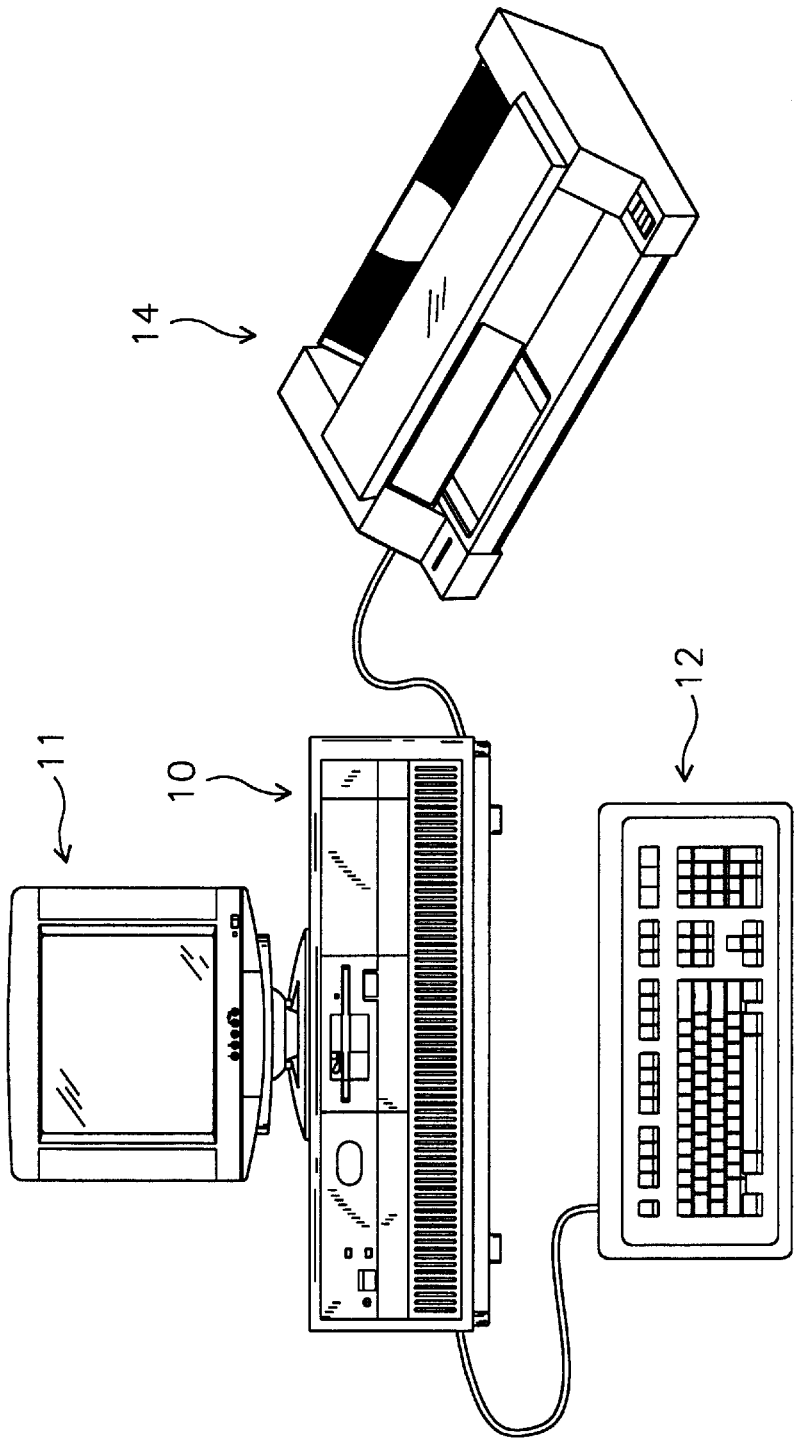
FIG. 1 is a schematic diagram showing the combination of a typical personal computer and peripheral devices thereof.
Figure 2:
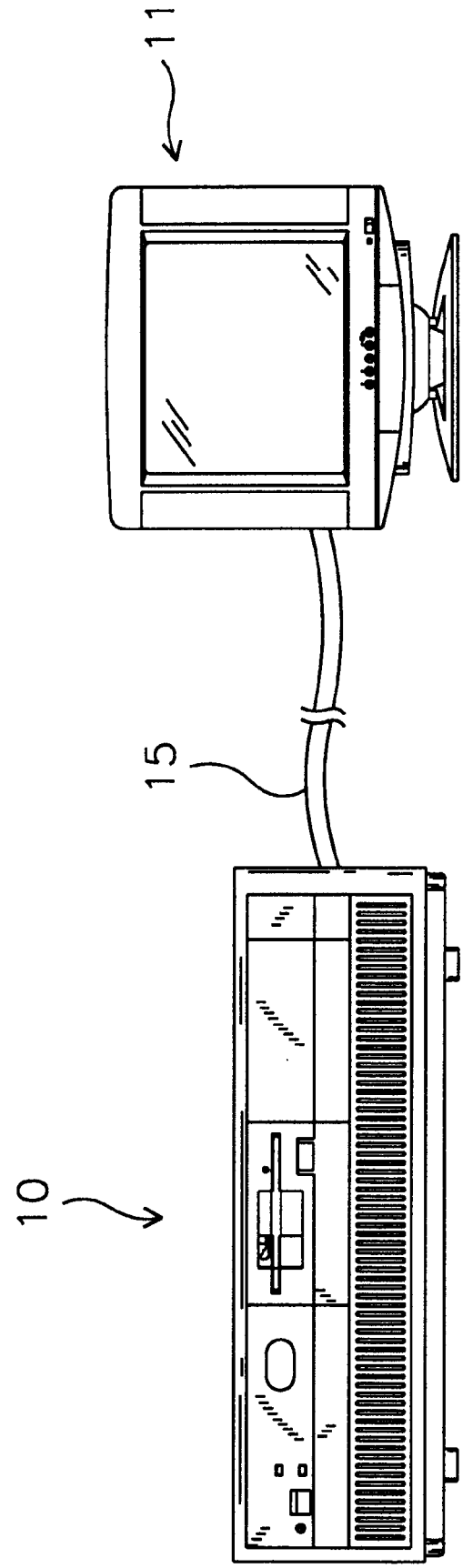
FIG. 2 is a schematic diagram showing the connection of the typical personal computer and a computer monitor over a video cable connected therebetween.

As shown in FIG. 1, a typical personal computer 10 may have an associated monitor 11 serving as a display apparatus, a keyboard 12 and a printer 14, a light pen or a plotter. The monitor 11 associated with the computer 10 is, as shown in FIG. 2, connected with a body of the computer 10 via a video cable 15, such as a D-Sub cable or a BNC video cable. The computer 10 provides video signals, e.g., R(red), G(green) and B(blue) video signals, vertical and horizontal synchronization signals, and overall information required to control the monitor 11, to the monitor 11 through the video cable 15. Also, through the video cable 15, information indicative of the monitor-processed results from the monitor 11 are provided to the computer 10.

In addition to the keyboard 10 and the monitor 11, if the other peripheral devices, such as a printer, a light pen, a plotter and the like, are connected with the conventional computer 10 shown in FIG. 1, it is complicated to connect the computer 10 and the peripheral devices. Also, since the conventional computer 10 is not provided with plug and play function, it is difficult for a user to connect the peripheral devices to the computer 10.

Figure 3:
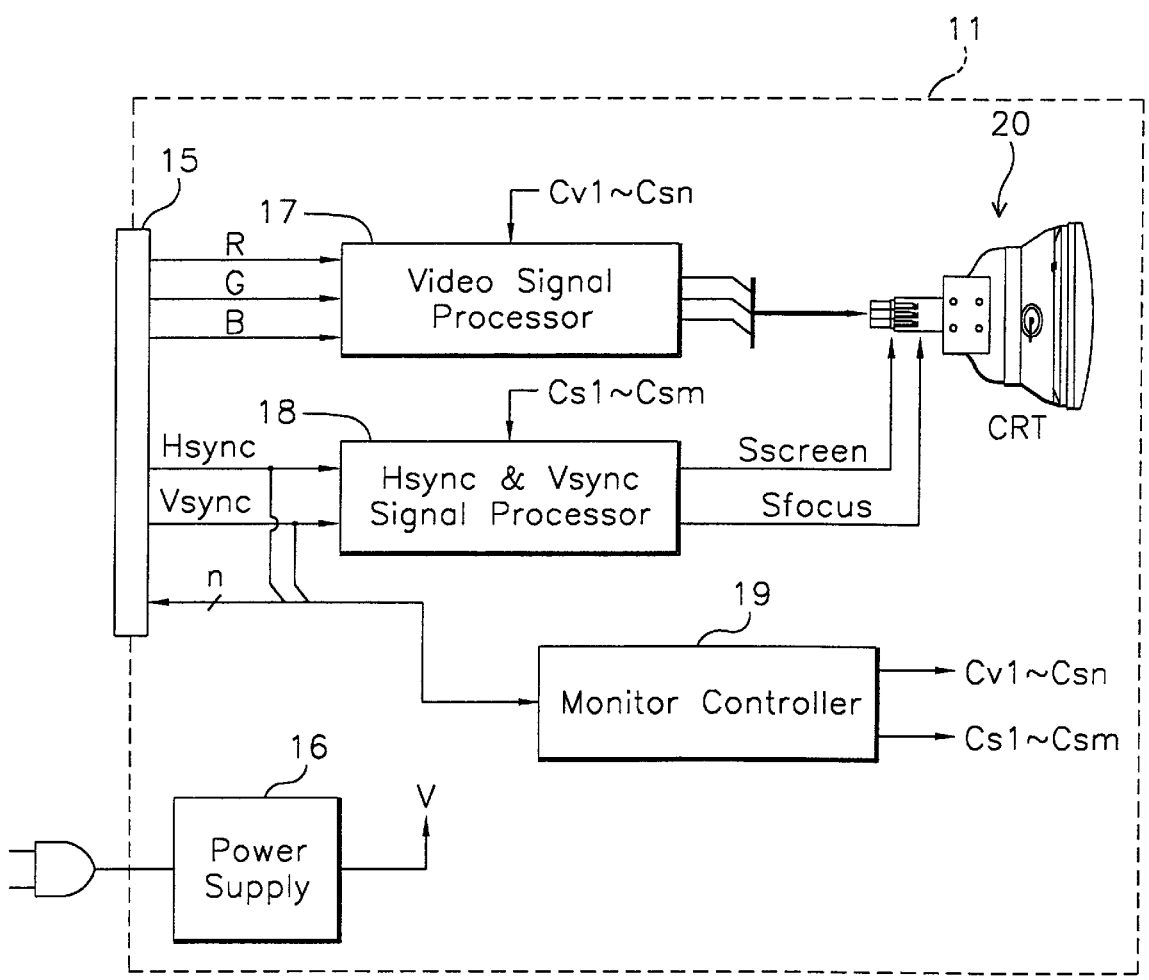
FIG. 3 is a block diagram showing a conventional monitor circuit.
Figure 4:
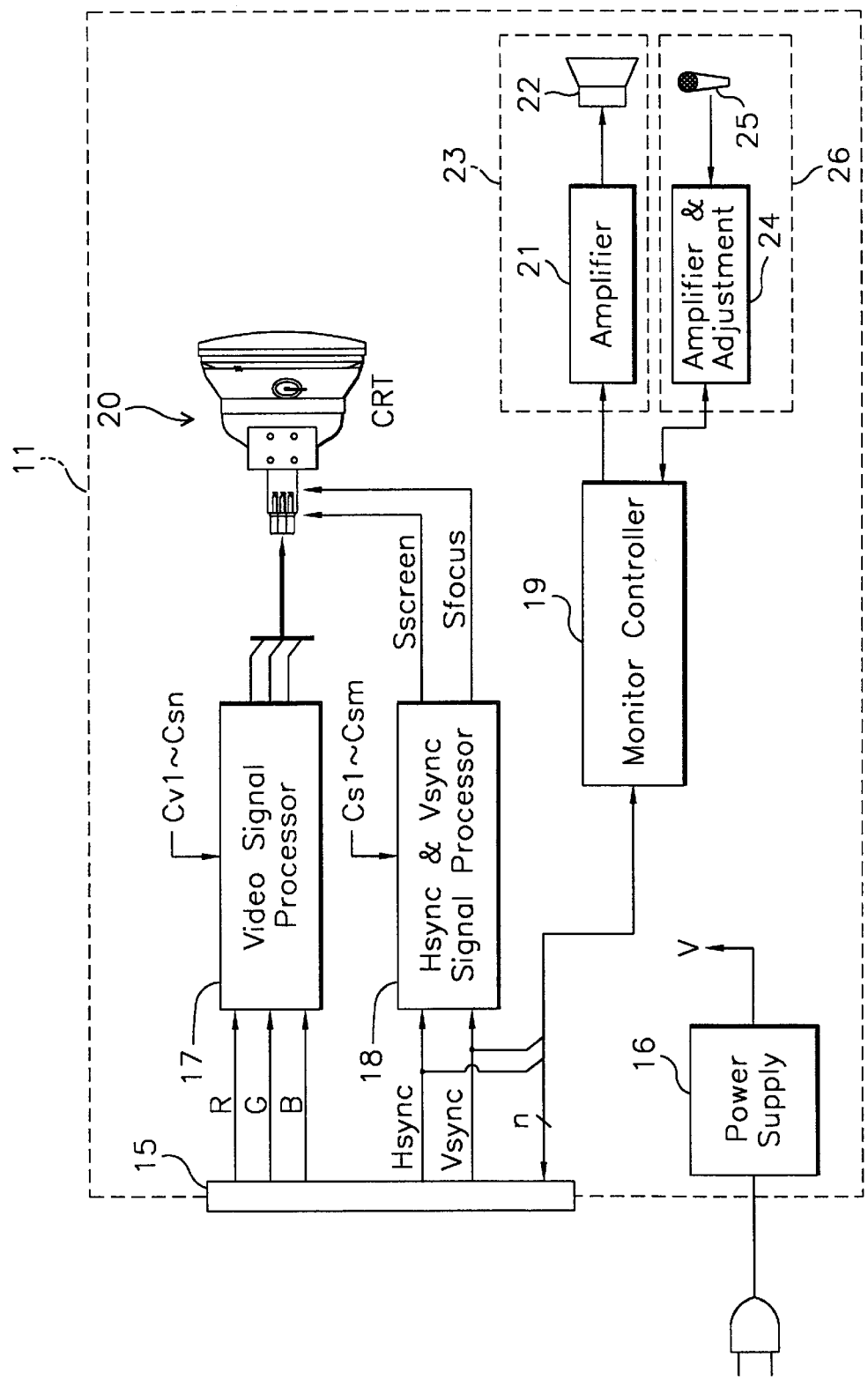
FIG. 4 is a block diagram of another conventional monitor circuit in which a speaker unit and a microphone unit are embodied.

So as to solve the above described problems, a universal serial bus system has been developed. FIGS. 3 and 4 show conventional monitor circuits each of which is not provided with the universal serial bus system.

The conventional monitor of FIG. 3 has five main sections, a power supply 16, a video signal processor 17, a horizontal/vertical synchronization signal processor 18, a monitor controller 19 and a cathode ray tube 20. The power supply 16 receives an AC (alternating current) voltage which is externally applied through a plug, and provides several levels of DC (direct current) voltages to respective monitor circuit components. Also, the power supply 16 has a monitor power management system (DPMS) for reducing power consumption.

The monitor controller 19 receives monitor driving information through the video cable 15 connected with the computer 10 and generates two groups of control signals, i.e., a first group of control signals Cv1–Cvn necessary for processing the red, green and blue video signals and a second group of control signals Cs1–Csm used to control screen and focus, in response to the monitor driving information.

The video signal processor 17 is provided to process the video signals from the computer 10 via the video cable 15 in response to the first group of control signals Cv1–Cvn. The video signals processed thus are applied to electron guns of the cathode ray tube 20 so that the electron guns can radiate beams corresponding the red, green and blue video signals. A horizontal/vertical synchronization signal processor is provided to process horizontal and vertical synchronization signals (hereinafter, referred to as "Hsync and Vsync") which are applied from the computer 10 via the video cable 15 and deflect the beams from the electron guns in a direction, so that screen and focus can be controlled.

FIG. 4 shows the circuit construction of an additional conventional computer monitor. This conventional computer monitor has the same construction as that of FIG. 3 except that the monitor of FIG. 3 has an audio unit 23 for generating an audio signal and a voice input unit 26 for converting an audio signal into an electrical signal.

As shown in FIG. 4, the audio unit 23 has an amplifier 21 for amplifying an audio signal from the monitor controller 19 and a speaker 22 for converting the audio signal amplified thus into a voice signal. Also, the voice input unit 26 has a microphone 25 for converting a voice signal into an electrical signal, and an amplifier&adjustment section 24 for amplifying the electrical signal and adjusting an input level of the microphone 25. Similarly to the monitor of FIG. 2, the monitors shown in FIGS. 3 and 4 have the above described problems such as, difficulty of use for PC peripheral expansion and the like. Also, since the conventional monitors do not have connectors for communicating with peripheral devices, plug&play function cannot be performed.

Figure 7:
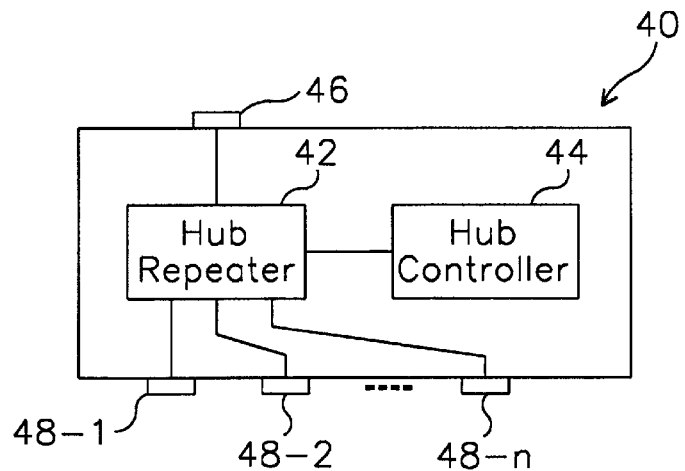
FIG. 7 is a detailed block diagram showing the circuit construction of the universal serial bus hub shown in FIG. 6.

Turning now to FIG. 7, a novel computer monitor in accordance with the present invention has a hub system which is capable of communicating with computer peripherals (e.g., universal serial bus devices) and providing power from a power supply incorporated with the monitor to a selected universal serial bus device. The universal serial bus is a cable bus that supports data exchange between a host computer and a wide range of simultaneously accessible peripherals. A universal serial bus system may be defined by three definitional areas: universal serial bus interconnect, universal serial bus devices, and universal serial bus host. The universal serial bus interconnect is the definitional area in which the universal serial bus devices are connected to and communicate with the host computer. The universal serial bus devices are hubs which provide additional attachment points to the universal serial bus devices, and have functions which provide capabilities to the system; for example, an ISDN connection, a digital joystick, or speakers.

Figure 5:
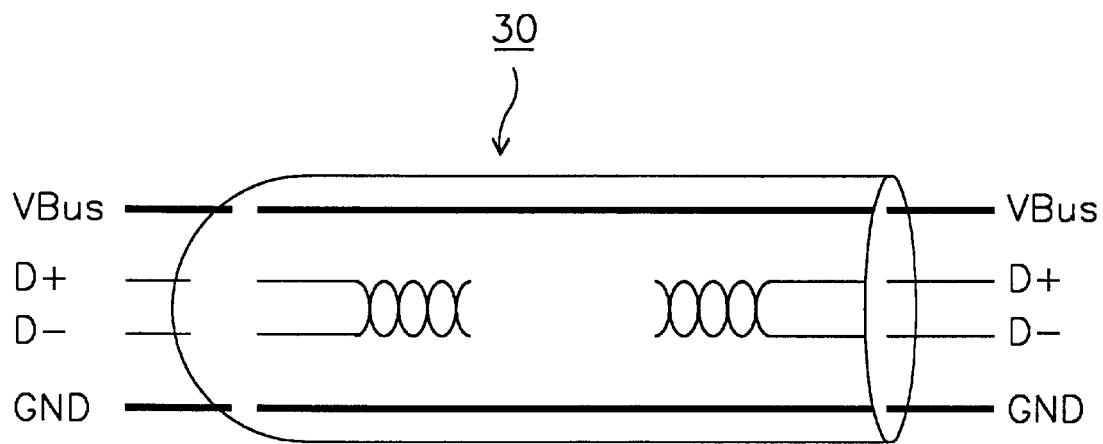
FIG. 5 is a schematic diagram showing a universal serial bus cable which is provided to incorporate with a novel computer monitor according to the present invention.

The universal serial bus transfers signal and power over a four wire cable 30, shown in FIG. 5. There are two modes of signaling, one of which is universal serial bus full speed signaling bit rate of 12 Mbs, and the other is a limited capability low speed signaling mode defined at 1.5 Mbs. The universal serial bus cable 30 of FIG. 5 has four wires. Of the four wires, two wires VBus and GND are provided to deliver power to the universal serial bus devices. The other wires D+ and D– are provided to transfer the universal serial bus transfer signal. The Vbus is nominally +5 V at the source.

Figure 6:
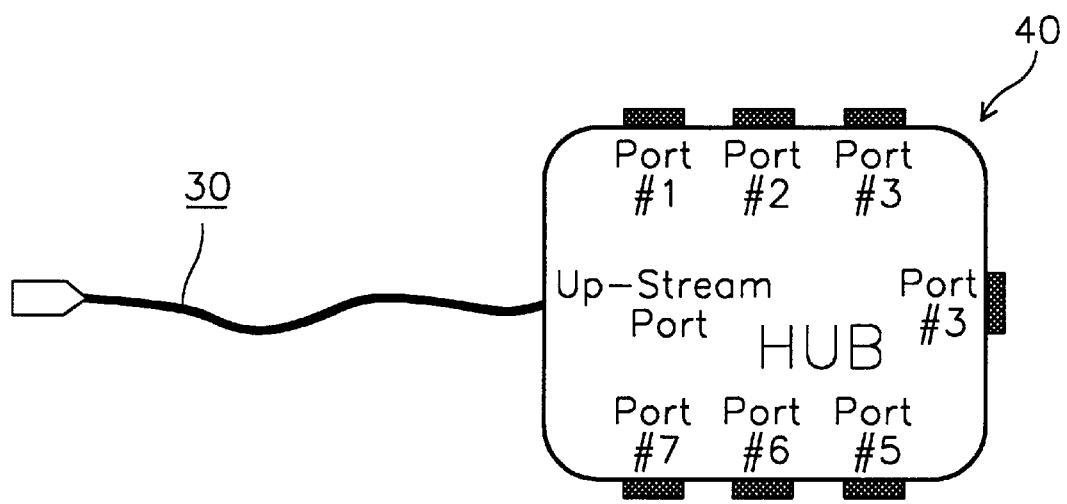
FIG. 6 is a schematic diagram showing a universal serial bus hub which is provided to incorporate with the novel computer monitor according to FIG. 5.

The universal serial bus hub 40 repeats, as shown in FIG. 6, upstream data provided through the upstream port thereof to a plurality of downstream ports Port#1 to Port#7, and controls communication speed (i.e., 12 Mbs or 1.5 Mbs) and supply of power to the downstream ports by means of the control of a controller thereof. Also, the universal serial bus hub 40 has two main sections, a hub controller 44 and a hub repeater 42. The hub repeater 42 is a protocol switch between the upstream port 46 and the downstream ports 48-1, 48-2, ..., 48-n. The hub controller 44 has an interface register to allow communication to/from the host computer.

Figure 8:
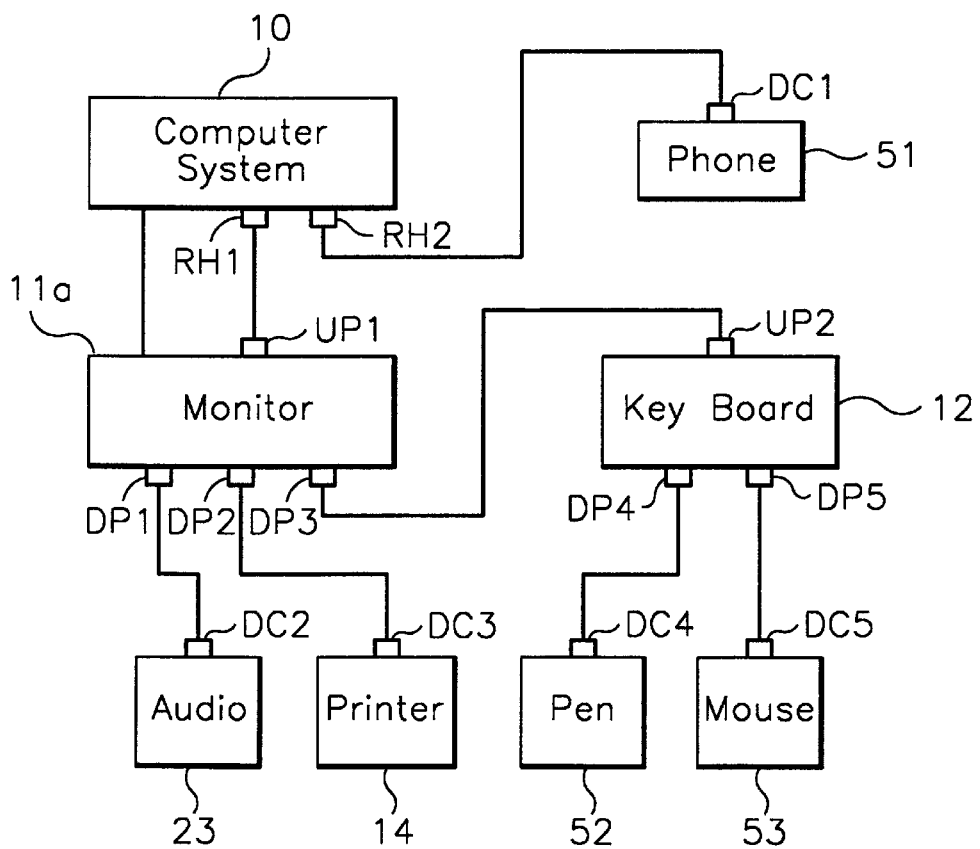
FIG. 8 is a schematic diagram showing the connection of the novel computer monitor to a computer system through the universal serial bus hub.

FIG. 8 shows the connection of the novel computer monitor to a computer system through the universal serial bus hub 40. In FIG. 8, the computer system 10 has, for example, two root hubs RH1 and RH2. The root hub RH2 is connected through a universal serial bus cable to the universal serial bus device connector DC1 with which a telephone 51 is provided, and thereby it serves as a communication hub. The root hub RH1 is connected through another universal serial bus cable to the upstream port UP1 of the hub with which a computer monitor 11a is provided. Since the hub of the computer monitor 11a is composed of a self-powered device, and thus can supply power to universal serial bus devices connected therewith.

Namely, as shown in FIG. 8, downstream ports DP1 and DP2 of the hub incorporated with the monitor 11a are connected through universal serial bus device connectors DC2 and DC3 to audio unit 23 and a printer 14, and a down stream ports DP3 thereof is connected through an upstream port DP2 of the hub with which a keyboard 12 is provided. The hub incorporated with the keyboard 12 is composed of a bus-powered device, and supplies power through a universal serial bus cable to universal serial bus devices, e.g., a light pen 52 and a mouse 53, as shown in FIG. 8. Thus, downstream ports DP4 and DP5 of the keyboard 12 are connected to universal serial bus device connectors DC4 and DC5 of the light pen 52 and mouse 53, respectively.

As described immediately above, the computer monitor 11a of the present invention has a hub which allows self-supplied power to be provided to universal serial bus devices connected therewith, and therefore the computer peripherals can be connected directly to the computer monitor 11a. Accordingly, the computer monitor 11a allows a plug and play function to be performed.

EXAMPLE ONE

Figure 9:
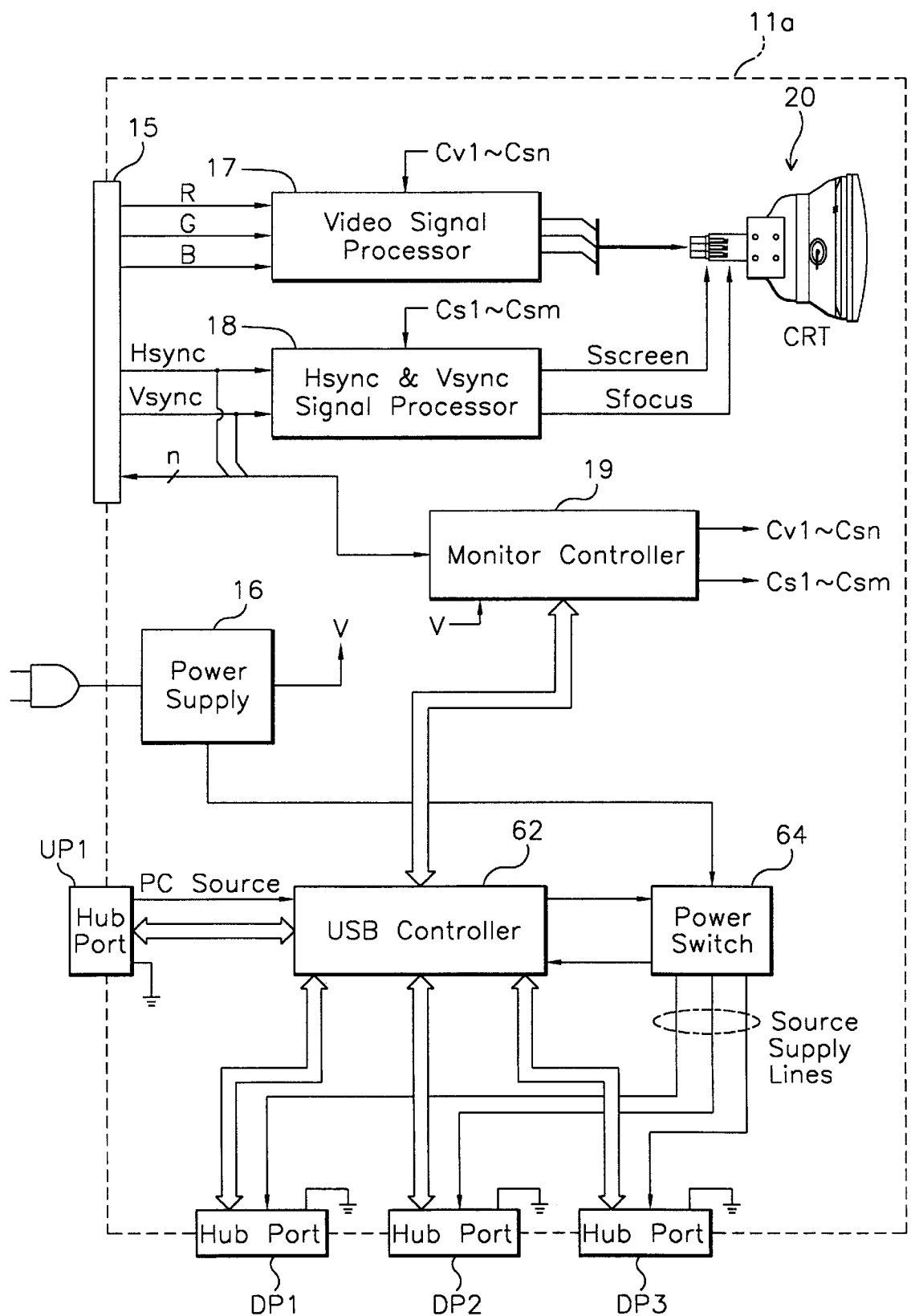
FIG. 9 is a circuit diagram showing a novel computer monitor according to a first embodiment of the present invention.

FIG. 9 is a circuit diagram showing a novel computer monitor according to a first embodiment of the present invention, and the same components as those in FIG. 8 are indicated by the same reference numerals.

Referring to FIG. 9, the novel computer monitor 11a comprises a hub system used for expansion of computer peripherals. In addition to the hub system, the computer monitor 11a comprises a power supply 16, a video signal processor 17, a horizontal/vertical synchronization signal processor 18, a monitor controller 19 and a cathode ray tube 20. The power supply 16 receives an AC (alternating current) voltage which is externally applied through a plug, and provides several levels of DC (direct current) voltages to respective monitor circuit components. Also, the power supply 16 has a monitor power management system for reducing power consumption.

Referring again to FIG. 9, the monitor controller 19 receives monitor driving information through the video cable 15 connected with the computer 10 and generates two groups of control signals, i.e., a first group of control signals Cv1–Cvn necessary for processing the red, green and blue video signals and a second group of control signals Cs1–Csm used to control screen and focus, in response to the monitor driving information. The first group of control signals Cv1–Cvn comprise a screen adjusting signal, red, green and blue driving signals and RGB cut-off adjusting signals. The video signal processor 17 is provided to process the video signals from the computer 10 via the video cable 15 in response to the first group of control signals Cv1–Cvn. The video signals processed thus are applied to electron guns of the cathode ray tube 20 so that the electron guns can radiate beams corresponding the red, green and blue video signals.

Th horizontal/vertical synchronization signal processor 18 is provided to process horizontal and vertical synchronization signals (hereinafter, referred to as "Hsync and Vsync") which are applied from the computer 10 via the video cable 15 and deflect the beams from the electron guns in a direction, so that screen and focus can be controlled. Namely, the Hsync/Vsync processor 18 can control, in response to the processed Hsync and Vsync signals, horizontal position and size of an image displayed on screen, vertical position and size of the image, side pincushion, tilt, pin valance, top and bottom corner corrections, and the like.

The hub system incorporated in the computer monitor 11a comprises, as shown in FIG. 9, three main sections, a universal serial bus controller 62, a power switch 64 and a plurality of input/output ports. The universal serial bus controller 62 is connected through $I^2C$ or universal asynchronous receiver transmitter to the monitor controller 19 so as to communicate to or from the monitor controller 19, and provided to perform a programmed control operation in response to information from the computer system 10. The power switch 64 is provided to receive power generated from the power supply 16 and selectively distribute the power to the universal serial bus devices in response to control signals from the universal serial bus controller 62. Of the input/output ports, the input port indicates an upstream port UP1 which receives the distributed power and information applied through the root hub RH1 of the computer system 10, and the output ports indicate downstream ports DP1 to DP3 which are connected with the universal serial bus devices, i.e., the keyboard 12, the audio unit 23 and the printer 14 to transmit the power and information thereto.

On the other hand, the power supply 16 has a effective power saving function and is controlled in accordance with a display power management system of video electronic standard association. Also, the power supply 16 operates in accordance with power saving operations having a stand-by mode, a suspend mode and a power off mode. If the computer monitor 11a is powered off, a power indicator which is located on the front vessel (not shown) of the monitor 11a is flickered about every 0.5 second during the stand-by mode or the suspend mode, and about every 1 second during the power off mode. During the power saving operations, if an key entry occurs from an input device such as a keyboard or a mouse, the previous image can automatically be recovered on screen.

Also, during normal operation, the power supply 16 supplies several levels of power voltages such as, +80 V, +150 V, +24 V, +12 V, +5 V and the like, to components of the monitor 11a. Particularly, the +5 V power is used as power of the respective universal serial bus downstream ports in the hub system and switched by the control signal from the universal serial bus controller 62.

Similarly to the universal serial bus cable of FIG. 5, the upstream port UP1 of FIG. 9 has four segments, i.e., Vdd, data+, data– and ground segments. The universal serial bus controller 62 receives data which are provided from the computer system 10, through the upstream port UP1, and repeats the data to the downstream ports DP1–DP3. Also, the universal serial bus controller 62 analyzes a monitor control signal from the computer system 10 and transmits the analyzed information to the monitor controller 19 by means of the communication protocol of I²C or universal asynchronous receiver transmitter.

Figure 10:
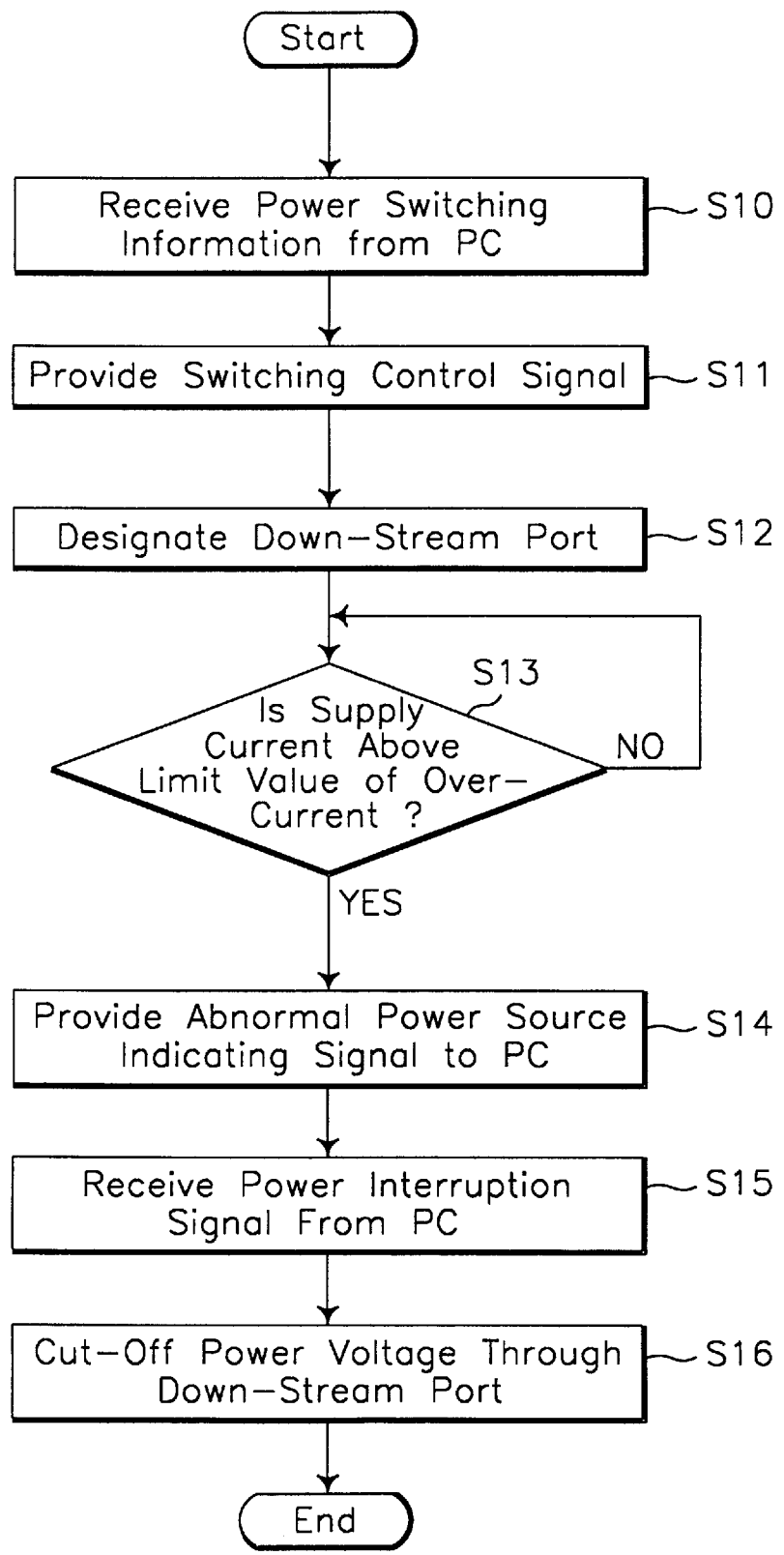
FIG. 10 is a flow chart showing a method of controlling supply of power in the computer monitor shown in FIG. 9.

FIG. 10 is a flow chart showing a method of controlling supply of power in the computer monitor 11a shown in FIG. 9. The controlling operation is performed in the universal serial bus controller 62. At step S10, universal serial bus controller 62 receives and analyzes a power control signal from the computer system 10. At this time, the control proceeds to step S11, wherein the controller 62 provides a power switching control signal to the power switch 64, which is composed of a multiplexer circuit and a microcomputer. At step S12, the power switch 64 designates corresponding ports of the downstream ports DP1–DP3 in response to the power switching control signal, so that power from the power supply 16 can be supplied through the designated ports. The control proceeds to step S13, wherein the universal serial bus controller 62 checks whether the power through the designated ports is above the limit value of over-current. If so, the control proceeds to step S14, wherein the universal serial bus controller 62 provides an abnormal power indicating signal to the computer system 10, and the control proceeds to step S15. At step S15, the computer system 10 receives the abnormal power indicating signal and generates a cut-off control signal of power. At step S16, the cut-off control signal is provided to the computer monitor 11a, so that power supplied through the designated downstream ports of the monitor 11a is cut off. In this embodiment, the monitor 11a can connect through the downstream ports thereof with the computer peripherals, and can control the selective supply of power to the computer peripherals.

EXAMPLE TWO

Figure 11:
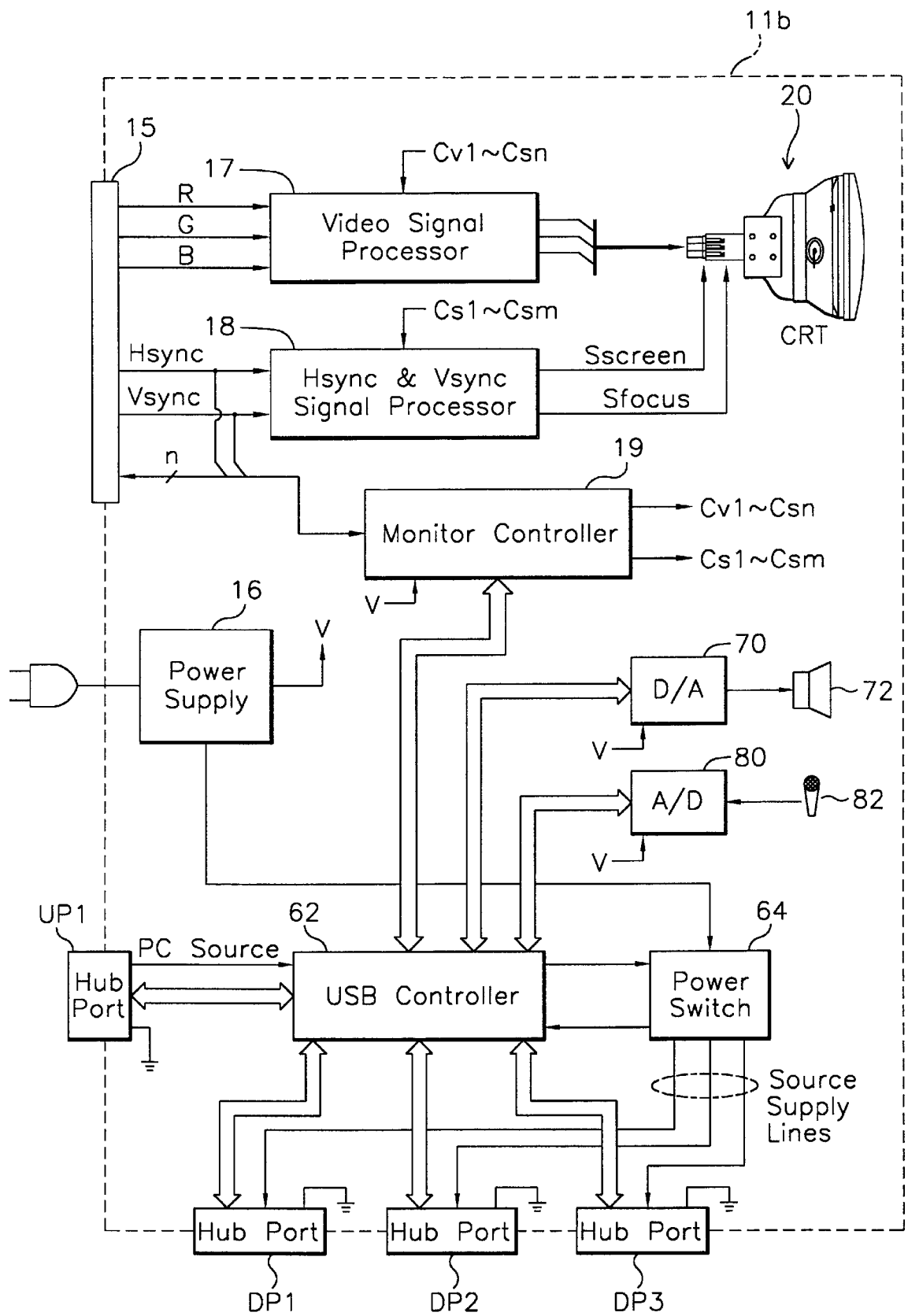
FIG. 11 is a circuit diagram showing a novel computer monitor according to a second embodiment of the present invention.

FIG. 11 is a circuit diagram showing a novel computer monitor according to a second embodiment of the present invention, and the same components as those in FIG. 9 are indicated by the same reference numerals. Computer monitor 11b has a hub system used for expansion of computer peripherals, a power supply 16, a video signal processor 17, a horizontal/vertical synchronization signal processor 18, a monitor controller 19 and a cathode raytube 20. The monitor 11b has an audio decoder 70 connected between the universal serial bus controller 62 and a speaker 72, and an audio encoder 80 which is connected between the universal serial bus controller 62 and a microphone 82. The audio decoder 70 is constructed with a digital-to-analog converter, and the audio encoder 80 is constructed with an analog-to-digital converter installed outside the universal serial bus controller 62, as is shown in FIG. 11.

In the embodiment, the universal serial bus controller 62 receives a digital audio signal from an audio system (not shown), which is connected with one of the downstream ports DP1 to DP3, and provides the audio signal to the audio decoder 70. Alternatively, the universal serial bus controller 62 receives a digital audio signal via the upstream port UP1 from the computer system 10 and provides the audio signal to the audio decoder 70. The audio decoder 70 converts the digital audio signal into an analog audio signal to be provided to the speaker 72.

Also, the universal serial bus controller 62 receives an electrical voice signal, which is generated by the microphone 82, through the audio encoder 80, and provide the voice signal through the corresponding downstream port to the audio system or the voice signal through the upstream port UP1 to the computer system 10. Voice is converted into an electrical analog signal by means of the microphone 82 and this analog signal is converted into an digital signal by means of the audio encoder 80.

EXAMPLE THREE

Figure 12:
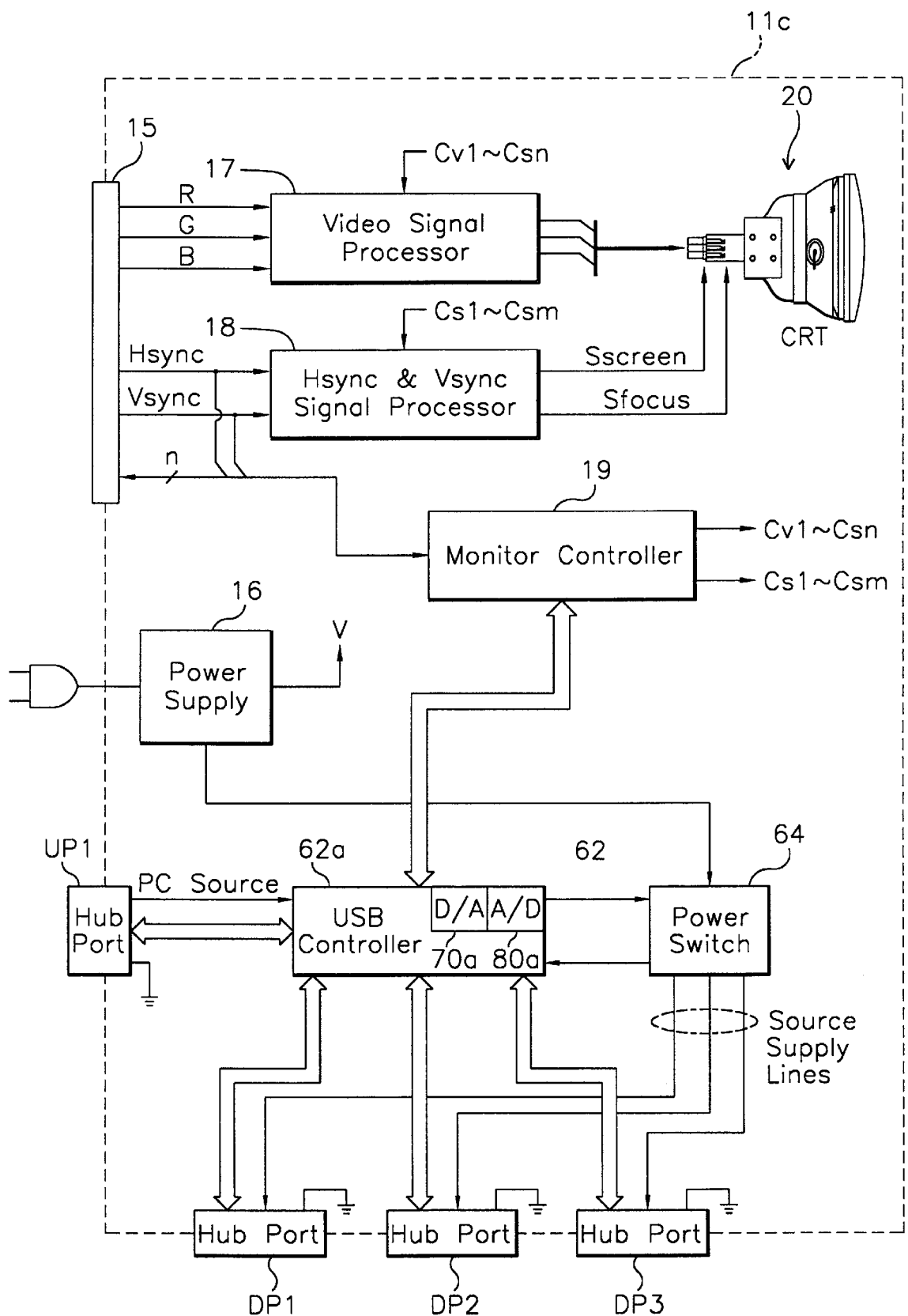
FIG. 12 is a circuit diagram showing a novel computer monitor according to a third embodiment of the present invention.

FIG. 12 is a circuit diagram showing a novel computer monitor according to a third embodiment of the present invention, and the same components as those in FIG. 11 are indicated by the same reference numerals to omit the description thereof Computer monitor 11c of FIG. 12 has the same construction as that of FIG. 11 except that an audio decoder 70a and an audio encoder 80a are embodied within a universal serial bus controller 62a. Audio decoder 70a may be constructed with a digital-to-analog converter, and the audio encoder 80a constituted with an analog-to-digital converter are embodied in the universal serial bus controller 62a. In the monitor 11c, the universal serial bus controller 62a receives a digital audio signal from an audio system (not shown), which is connected with one of the downstream ports DP1 to DP3, and provides the audio signal to the audio decoder 70a. Alternatively, the universal serial bus controller 62a receives a digital audio signal via the upstream port UP1 from the computer system 10 and provides the audio signal to the audio decoder 70a. The audio decoder 70a converts the digital audio signal into an analog audio signal to be provided to the speaker 72.

Also, the universal serial bus controller 62a receives an electrical voice signal, which is generated by the microphone 82, through the audio encoder 80a, and provide the voice signal through the corresponding downstream port to the audio system or the voice signal through the upstream port UP1 to the computer system 10. Voice is converted into an electrical analog signal by means of the microphone 82 and this analog signal is converted into an digital signal by means of the audio encoder 80a.

EXAMPLE FOUR

Figure 13:
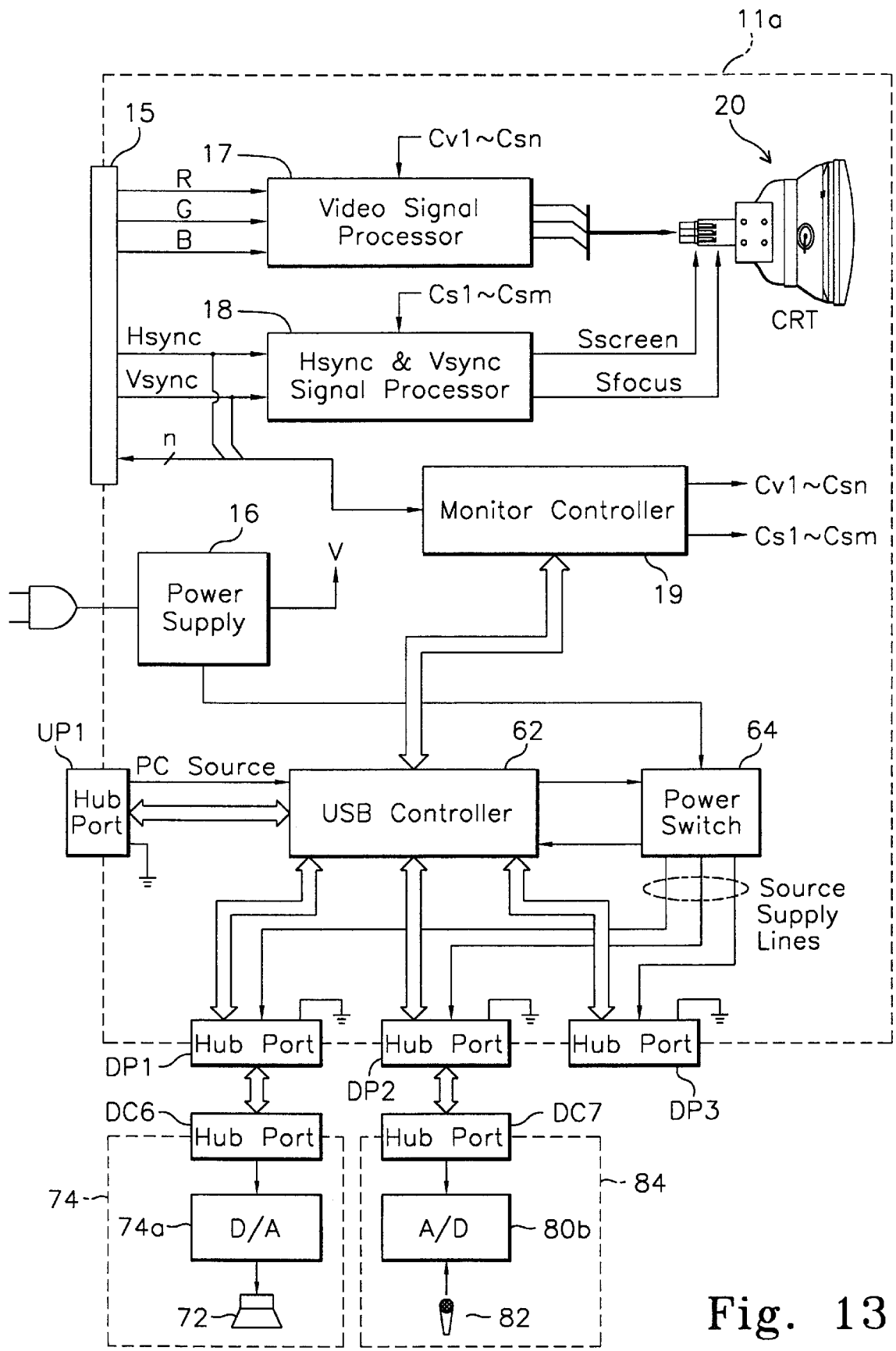
FIG. 13 is a circuit diagram showing a novel computer monitor according to a fourth embodiment of the present invention.

FIG. 13 is a circuit diagram showing a novel computer monitor according to a fourth embodiment of the present invention, and the same components as those in FIG. 9 are indicated by the same reference numerals to omit the description thereof Computer monitor 11a is connected with a speaker unit 74 through the hub downstream port DP1 thereof and with a microphone unit 84 through the hub downstream port DP2 thereof. The speaker unit 74 has a universal serial bus device connector DC6, which is connected with the hub downstream port DP1, an audio decoder 70b and a speaker 72. The microphone unit 84 has a universal serial bus device connector DC7, which is connected with the hub downstream port DP2, an audio encoder 80b and a microphone 82. The audio decoder 70b constituted with a digital-to-analog converter, and the audio encoder 80b constituted with an analog-to-digital converter are connected with the hub downstream ports DP1 and DP2, respectively.

As described above, a computer monitor according to the present invention has a universal serial bus hub capable of connecting computer peripherals, and thereby it is easy to connect the monitor with universal serial bus devices, i.e., computer peripherals. Also, power provided from a power supply in the monitor is capable of being supplied through the universal serial bus devices. In addition, audio systems can be easily connected with the monitor owing to the easy connection of the universal serial bus hub with the audio systems.

What is claimed is:

1. A computer monitor, comprising:

a power supply for converting an externally applied alternating current power into a direct current (DC) power; and a universal serial bus hub having at least one upstream port and a plurality of downstream ports;

means for electrically connecting said upstream port in communication with a computer system having a root hub, for electrically connecting said plurality of downstream ports in response to a power switching control signal in accordance with power supply control information from the computer system through said upstream port, and for selectively providing said direct current (DC) power to external devices respectively connected with said plurality of downstream ports in response to said power switching control signal.

2. The computer monitor according to claim 1, wherein said computer monitor is a cathode ray tube monitor.

3. The computer monitor according to claim 2, further comprising:

a monitor controller for generating two groups of control signals in response to monitor driving information applied through said upstream port from said computer system, a first of said two groups of control signals being required to process a plurality of video signals and a second of said two groups of control signals being required to control screen and focus of said computer monitor;

a video signal processor for processing said plurality of video signals from said computer system via a universal serial bus cable connected between said computer system and said computer monitor to provide processed video signals to a plurality of electron guns of said computer monitor; and a horizontal/vertical synchronization signal processor for deflecting beams generated from said plurality of electron guns in response to horizontal and vertical synchronization signals applied from said computer system via said universal serial bus cable so as to adjust said screen and said focus of said computer monitor.

4. The computer monitor according to claim 1, wherein said power supply includes a display power management system of video electronic standard association for controlling said power supply.

5. The computer monitor according to claim 4, wherein said power supply operates in accordance with power saving operations including a stand-by mode, a suspend mode and a power off mode.

6. The computer monitor according to claim 1, wherein said power supply uses said direct current (DC) power of about +5 volts (V) as an operation voltage of said plurality of downstream ports.

7. The computer monitor according to claim 1, wherein said upstream port has two power sources and two data transmitting segments, said two power sources having a power supply segment and a ground segment.

8. The computer monitor according to claim 1, wherein said universal serial bus hub comprises a universal serial bus controller for performing a control operation in accordance with information received from said computer system via said root hub, and a power switching portion for selectively providing said direct current (DC) power to a plurality of universal serial bus devices by means of control of said universal serial bus controller.

9. The computer monitor according to claim 8, wherein said plurality of universal serial bus devices include any one of peripheral devices including a keyboard, an audio system and a printer.

10. The computer monitor according to claim 9, wherein a monitor controller and said universal serial bus controller are electrically connected by any one of interintegrated circuit serial interface (I$^2$C) and universal asynchronous receiver transmitter.

11. The computer monitor according to claim 8, wherein said universal serial bus controller receives data from said computer system over said upstream port and relays said data to said plurality of downstream ports.

12. The computer monitor according to claim 8, wherein said universal serial bus controller stores and analyzes two groups of control signals from said computer system so as to retransmit said two groups of control signals to a monitor controller by means of a protocol of any one of inter-integrated circuit serial interface (I$^2$C) and universal asynchronous receiver transmitter, a first of said two groups of control signals being required to process a plurality of video signals and a second of said two groups of control signals being required to control screen and focus of said computer monitor.

13. The computer monitor according to claim 8, wherein said universal serial bus controller further comprises means for decoding digital information of voice generated for a speaker unit and means for encoding an analog signal of voice generated from a microphone unit.

14. The computer monitor according to claim 13, wherein said decoding means comprises a digital-to-analog converter for converting said digital information of voice into analog signal, and wherein said encoding means comprises an analog-to-digital converter for converting said analog signal of voice into a digital signal.

15. The computer monitor according to claim 8, wherein said monitor further comprises a decoder for decoding digital information of voice generated for a speaker unit, and an encoder for encoding an analog signal of voice generated from a microphone unit, said decoder and said encoder being located outside said universal serial bus controller.

16. The computer monitor according to claim 8, further comprising means for decoding digital information of voice generated for a speaker unit.

17. The computer monitor according to claim 8, further comprising means for encoding an analog signal of voice generated from a microphone unit.

18. The computer monitor according to claim 16, wherein said means for decoding comprises a decoder for decoding said digital information of voice into an analog signal.

19. The computer monitor according to claim 17, wherein said means for encoding comprises an encoder for encoding said analog signal of voice into a digital signal.

20. The computer monitor according to claim 8, further comprising a speaker unit connected to one downstream port of said plurality of downstream ports.

21. The computer monitor according to claim 20, wherein said speaker unit comprises a speaker, means for converting digital information of voice generated for said speaker into an analog voice signal, and a universal serial bus device connector connected to said one downstream port of said plurality of downstream ports.

22. The computer monitor according to claim 8, further comprising a microphone unit connected to a downstream port of said plurality of downstream ports.

23. The computer monitor according to claim 22, wherein said microphone unit comprises a microphone and means for converting an analog voice signal provided from said microphone into a digital voice signal.

24. The computer monitor according to claim 8, further comprising a speaker unit connected to one downstream port of said plurality of downstream ports and a microphone unit connected to another downstream port of said plurality of downstream ports.

25. The computer monitor according to claim 24, wherein said speaker unit comprises a speaker, means for converting digital information of voice generated for said speaker into an analog voice signal, and a universal serial bus device connector connected to said one downstream port, and wherein said microphone unit comprises a microphone and means for converting an analog voice signal provided from said microphone into a digital voice signal.

26. A method of controlling a power supply for use with a computer monitor, comprising the steps of:

provide a power supply for the computer monitor for converting an externally applied alternating current (AC) power into a direct current (DC) power;

providing a universal serial bus hub for the computer monitor having at least one upstream port and a plurality of downstream ports, said upstream port being electrically connected in communication with a computer system, and said plurality of downstream ports selectively receiving said direct current (DC) power in response to a power switching control signal in accordance with power supply control information from said computer system through said upstream port so as to selectively provide said direct current (DC) power to external devices respectively connected with said plurality of downstream ports in response to said power switching control signal;

generating said power switching control signal in accordance with said power supply control information from said computer system;

designating a downstream port of said plurality of downstream ports in response to said power switching control signal so as to supply said direct current (DC) power through the designated downstream port to a universal serial bus device connected with the designated downstream port;

determining whether said direct current (DC) power through the designated downstream port is above a limit value of over-current;

providing a signal indicative of more than the limit value of said over-current, when said direct current (DC) power through the designated downstream port is above the limit value of said over-current; and intercepting supply of said direct current (DC) power to said designated downstream port, when said direct current (DC) power through the designated downstream port is above the limit value of said over-current.

27. The method of claim 26, wherein said universal serial bus hub comprises a universal serial bus controller for performing a control operation in accordance with information received from said computer system via a root hub, and a power switching portion for selectively providing said direct current (DC) power to the universal serial bus device by means of control of said universal serial bus controller.

28. The method of claim 26, wherein said computer monitor further comprises:

a monitor controller for generating two groups of control signals in response to monitor driving information applied through said upstream port from said computer system, a first of said two groups of control signals being required to process a plurality of video signals and a second of said two groups of control signals being required to control screen and focus of said computer monitor;

a video signal processor for processing said plurality of video signals from said computer system via a universal serial bus cable connected between said computer system and said computer monitor to provide processed video signals to a plurality of electron guns of said computer monitor; and a horizontal/vertical synchronization signal processor for deflecting beams generated from said plurality of electron guns in response to horizontal and vertical synchronization signals applied from said computer system via said universal serial bus cable so as to adjust said screen and focus.

29. The method of claim 27, wherein said computer monitor further comprises:

a monitor controller for generating two groups of control signals in response to monitor driving information applied through said upstream port from said computer system, a first of said two groups of control signals being required to process a plurality of video signals and a second of said two groups of control signals being required to control screen and focus of said computer monitor;

a video signal processor for processing said plurality of video signals from said computer system via a universal serial bus cable connected between said computer system and said computer monitor to provide processed video signals to a plurality of electron guns of said computer monitor; and a horizontal/vertical synchronization signal processor for deflecting beams generated from said plurality of electron guns in response to horizontal and vertical synchronization signals applied from said computer system via said universal serial bus cable so as to adjust said screen and focus.

* * * * *